United States Patent
He et al.

(10) Patent No.: US 11,983,511 B2
(45) Date of Patent: May 14, 2024

(54) METHOD AND SYSTEM FOR GENERATING HIGH-ORDER PSEUDO-RANDOM ELECTROMAGNETIC EXPLORATION SIGNAL

(71) Applicants: SHANDONG UNIVERSITY, Shandong (CN); THE CHINESE UNIVERSITY OF HONG KONG, SHENZHEN, Guangdong (CN)

(72) Inventors: Jishan He, Jinan (CN); Yang Yang, Jinan (CN); Diquan Li, Jinan (CN); Jingbo Weng, Jinan (CN)

(73) Assignees: SHANDONG UNIVERSITY, Jinan (CN); THE CHINESE UNIVERSITY OF HONG KONG, SHENZHEN, Shenzhen (CN)

( * ) Notice: Subject to any disclaimer, the term of this patent is extended or adjusted under 35 U.S.C. 154(b) by 407 days.

(21) Appl. No.: 17/601,972

(22) PCT Filed: Mar. 30, 2021

(86) PCT No.: PCT/CN2021/083727
§ 371 (c)(1),
(2) Date: Oct. 7, 2021

(87) PCT Pub. No.: WO2021/218524
PCT Pub. Date: Nov. 4, 2021

(65) Prior Publication Data
US 2022/0308838 A1   Sep. 29, 2022

(30) Foreign Application Priority Data
Apr. 27, 2020  (CN) .......................... 202010344733.2

(51) Int. Cl.
G06F 7/58 (2006.01)
G01V 3/12 (2006.01)
G06F 7/68 (2006.01)

(52) U.S. Cl.
CPC ................ G06F 7/582 (2013.01); G01V 3/12 (2013.01); G06F 7/68 (2013.01)

(58) Field of Classification Search
CPC .. G06F 7/58; G06F 7/582; G06F 7/68; G01V 3/00–40; G01V 2003/086
See application file for complete search history.

(56) References Cited

FOREIGN PATENT DOCUMENTS

| CN | 1325031 A | 12/2001 |
|---|---|---|
| CN | 101672928 A | 3/2010 |

(Continued)

OTHER PUBLICATIONS

L. Wei-Qiang et al., Signal processing approaches to obtain complex resistivity and phase at multiple frequencies for the electrical exploration method, Bollettino di Geofisica Teorica ed Applicata, vol. 58, n. 2, 2017 (Year: 2017).*

(Continued)

*Primary Examiner* — Emily E Larocque
(74) *Attorney, Agent, or Firm* — Oliff PLC

(57) ABSTRACT

A method and system for generating a high-order pseudo-random electromagnetic exploration signal. The method includes: constructing two or more basic unit signals according to an exploration requirement, wherein the basic unit signals are stairstep signals obtained by superposing a plurality of in-phase periodic square wave signals, and a frequency ratio between adjacent ones of the plurality of periodic square wave signals is 2; and superposing the two or more basic unit signals to obtain superposed stairstep signals, and correcting amplitudes to be consistent with amplitudes of the periodic square wave signals, to obtain (Continued)

high-order $2^n$ sequence pseudo-random signals. The $2^n$ sequence stairstep signals of different orders can be constructed within a limited frequency interval.

7 Claims, 12 Drawing Sheets

(56) References Cited

FOREIGN PATENT DOCUMENTS

| | | |
|---|---|---|
| CN | 102098073 A | 6/2011 |
| CN | 108348595 A | 7/2018 |
| CN | 109005005 A | 12/2018 |
| CN | 111505722 A | 8/2020 |
| CN | 111505723 A | 8/2020 |
| CN | 111522064 A | 8/2020 |
| JP | 2019-184248 A | 10/2019 |

OTHER PUBLICATIONS

H. Zhou et al., Interaction between two adjacent grounded sources in frequency domain semi-airborne electromagnetic survey, Review of Scientific Instruments 87, Research article, 2016 (Year: 2016).*

Y.F. Hu et al., Application of pseudo-random frequency domain electromagnetic method in mining areas with strong interferences, Elsevier, Mar. 2020 (Year: 2020).*

Mathworks, Square Waves from Sine Waves, at https://www.mathworks.com/help/matlab/math/square-wave-from-sine-waves.html, 2012 (Year: 2012).*

W. Luo et al., Fine Exploration Based on Dense Frequency Pseudo-random Harmonic Electromagnetic Method, PIERS Proceedings, 2010 (Year: 2010).*

Y. Yang et al., A superposition algorithm to construct efficient pseudo-random waveform for frequency-domain controlled-source electromagnetic method, Geophysical Research Letters, 2022 (Year: 2022).*

Y.Yang, et al., Distributed wide field electromagnetic method based on high-order 2n sequence pseudo random signal, Trans. Nonferrous Met. Soc. China 32, 2022 (Year: 2022).*

Y. Yang, et al., Energy distribution and effective components analysis of 2n sequence pseudo-random signal, Trans. Nonferrous Met. Soc. China 31, 2021 (Year: 2021).*

Translation of May 27, 2021 International Search Report issued in International Patent Application No. PCT/CN2021/083727.

Translation of May 27, 2021 Written Opinion of the International Searching Authority issued in International Patent Application No. PCT/CN2021/083727.

Nov. 24, 2020 Office Action issued in Chinese Patent Application No. 202010344733.2.

Tong, Tiegang, "Study on E-Hz Wide area electromagnetic method," Basic Science of Chinese Doctoral Dissertation, Feb. 15, 2012, Issue 2, pp. 14, 16, 20 and 22, ISSN: 1674-022X.

* cited by examiner

Construct two or more basic unit signals according to an exploration requirement, where the basic unit signals are stairstep signals obtained by superposing a plurality of in-phase periodic square wave signals, and a frequency ratio between adjacent ones of the in-phase periodic square wave signals is 2

↓

Superpose the two or more basic unit signals to obtain superposed stairstep signals, and correct amplitudes to be consistent with amplitudes of the square wave signals, to obtain high-order 2n sequence pseudo-random signals

↓

Perform a phase adjustment on at least one of the two or more basic unit signals, find a phase that minimizes a mean square error of amplitudes of spectra corresponding to dominant frequencies in a superposed high-order 2n sequence pseudo-random signal as an optimal phase of the corresponding basic unit signal

↓

Superpose the two or more basic unit signals according to the optimal phase, and correct the amplitudes to be consistent with the amplitudes of the square wave signals, to obtain a final high-order 2n sequence pseudo-random signal

FIG. 1

METHOD AND SYSTEM FOR GENERATING HIGH-ORDER PSEUDO-RANDOM ELECTROMAGNETIC EXPLORATION SIGNAL

TECHNICAL FIELD

The present invention relates to the field of geophysical exploration, and in particular, to a method and system for generating a high-order pseudo-random electromagnetic exploration signal.

BACKGROUND

Descriptions herein only provide background techniques related to the present invention, and do not necessarily constitute the related art.

At present, there are various electromagnetic exploration methods, most of which perform signal encoding by adopting different pseudo-random encoding methods, especially in the field of frequency domain exploration. However, in the past, effective frequency band ranges of a large number of pseudo-random signals were narrow, frequency components of exploration signals needed to be continuously changed during exploration, to obtain exploration information of different frequency intervals, and then the exploration information is successively transmitted, which is a great waste of time and increases exploration costs.

SUMMARY

In order to overcome the above deficiency in the prior art, the present invention provides a method and system for generating a high-order pseudo-random electromagnetic exploration signal, so as to construct 2n sequence pseudo-random signals of different orders within a limited frequency interval, which have a higher resolution than conventional 2n sequence pseudo-random signals.

To achieve the foregoing objective, one or more embodiments of the present invention provide the following technical solutions:

A method for generating a high-order pseudo-random electromagnetic exploration signal, the method including:
  constructing two or more basic unit signals according to an exploration requirement, where the basic unit signals are stairstep signals obtained by superposing a plurality of in-phase periodic square wave signals, and a frequency ratio between adjacent ones of the plurality of square wave signals is 2; and
  superposing the two or more basic unit signals to obtain superposed stairstep signals, and correcting amplitudes to be consistent with amplitudes of the square wave signals, to obtain high-order 2n sequence pseudo-random signals.

One or more embodiments provide a computer readable storage medium, storing a plurality of instructions, where the instructions are adapted to be loaded by a processor of a terminal device to perform the method for generating a high-order pseudo-random electromagnetic exploration signal.

One or more embodiments provide an electrical exploration signal transmitter, configured to generate a high-order 2n sequence pseudo-random signal by using the method for generating a high-order pseudo-random electromagnetic exploration signal.

One or more embodiments provide an electrical exploration signal transmitter, configured to generate a high-order 2n sequence pseudo-random signal by using the method for generating a high-order pseudo-random electromagnetic exploration signal.

The foregoing one or more technical solutions have the following beneficial effects:

By means of the above technical solutions, a number of dominant frequencies can be increased within the limited frequency band range according to the exploration requirement, and 2n sequence stairstep signals of different orders can be constructed within a limited frequency interval, so as to increase density between the dominant frequencies, facilitating improvement of resolution during electromagnetic exploration.

The high-order pseudo-random signals can implement simultaneous transmission and receiving of dozens of frequencies. Compared with conventional single-frequency or multi-frequency transmission signals, mass data collection can be achieved, which greatly increases spectrum density and enhances resolution of longitudinal exploration. Under the condition that total working hours are the same, each frequency may collect data for a longer period of time, which can better suppress the influence of background noise, and improve anti-interference capability. In the meanwhile, only one set of combined waveforms needs to be transmitted during data collection without the need to change transmission waveforms. In addition, a plurality of receivers may be adopted to perform continuous rolling measurement, which fundamentally changes an observation mode of the conventional method for electromagnetic exploration that use artificial sources, thus achieving efficient collection of field data, which is especially applicable to large-area 3D exploration, and greatly reduces exploration costs. At present, the technical solutions have been successfully applicable to actual exploration in the field.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIG. 1 is a flowchart of a method for generating a high-order pseudo-random electromagnetic exploration signal according to an embodiment of the present invention.

Figure 2:
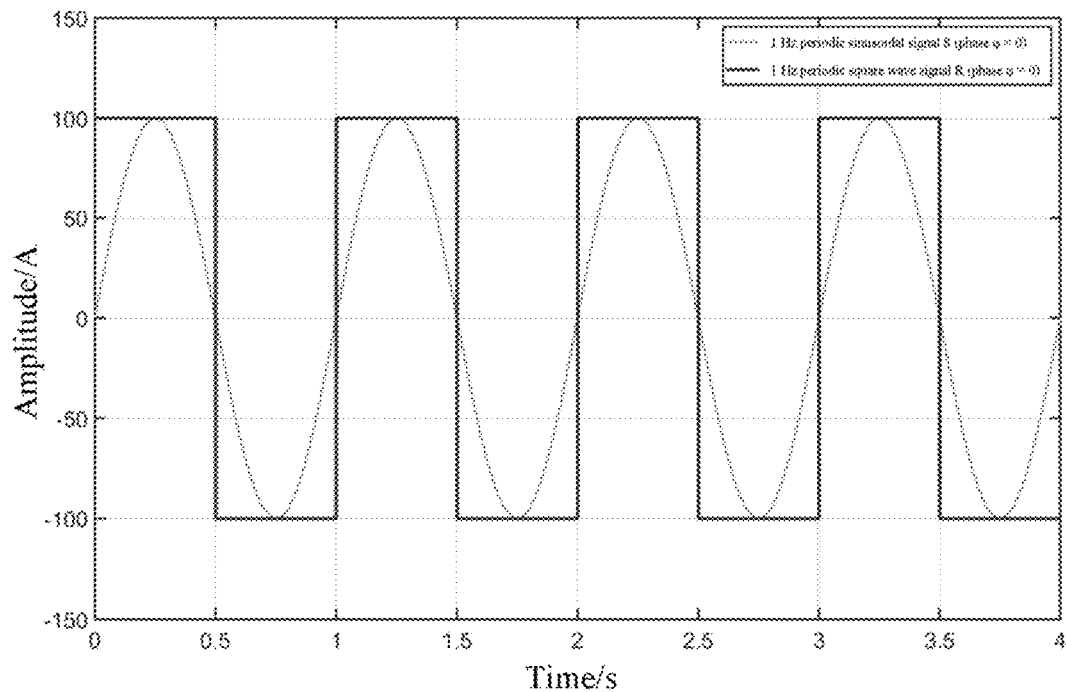
FIG. 2 is a schematic diagram of a correspondence between a 1 Hz periodic sinusoidal signal and a 1 Hz periodic square wave signal (phase $\varphi=0$) according to an embodiment of the present invention.

In the spectrogram involved in the above figures, a spectrum value only exists at an inflection point of a broken line. In order to show the magnitude and the changing trend of spectrum amplitudes more clearly, broken line graphs are adopted for representation in the embodiments of the present invention.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

The embodiments in the present invention and features in the embodiments may be mutually combined in case that no conflict occurs.

For demonstration, computer simulation signals are to be used as examples in the embodiments. An adopted sampling frequency is far higher than the frequency of the highest dominant frequency in pseudo-random signals, and calculation errors caused by signal discretization after a computer is introduced can be ignored.

Embodiment 1

This embodiment discloses a method for generating a high-order pseudo-random electromagnetic exploration signal. As shown in FIG. 1, the method includes the following steps.

Step 1: Construct two or more basic unit signals according to an exploration requirement, where the basic unit signals are stairstep signals obtained by superposing a plurality of in-phase periodic square wave signals, and a frequency ratio between adjacent ones of the plurality of square wave signals is 2.

A method for generating a periodic square wave includes:
generating sinusoidal signals having the same frequency as a target periodic square wave, setting values of the sinusoidal signals that are greater than 0 to A, setting values of the sinusoidal signals that are less than 0 to −A, and respectively setting 0 positions to A and −A according to parities in an index, specifically, identifying all 0 positions in the signals by using the index, and setting the positions to A and A according to parities, for example, setting values of the $1^{st}$, $3^{rd}$, $5^{th}$, . . . 0 positions to A, and setting values of the $2^{nd}$, $4^{th}$, $6^{th}$, . . . 0 positions to A, to obtain a series of periodic square wave signals having the same phase, where A≠0, a value of the phase may be adjusted as required, and the phase in this embodiment is 0.

A frequency range of dominant frequencies of the periodic square wave is related to a depth of exploration, and the lowest and highest frequencies of the dominant frequencies may be selected according to requirements for to-be-explored depths (such as deep, shallow, or other specific exploration depths) and empirical equations as assistance. Specifically, the method for generating a periodic square wave further includes: acquiring a range of to-be-explored depths required by a user; determining a highest frequency and a lowest frequency according to the range of to-be-explored depths; and then increasing multiples according to the acquired frequency required to obtain a corresponding frequency of the target periodic square wave.

1 Hz is used as an example for description. Firstly, a 1 Hz sinusoidal signal having an amplitude of 100 and a phase of 0 is generated: $S(t)=A \sin(2\pi ft+\varphi)$, where $S(t)$ is a sinusoidal signal, A is an amplitude, $\varphi$ is a phase, and f is a signal frequency. When the amplitude is 100, A=100, and the phase is 0, $\varphi=0$, and when the frequency is 1 Hz, f=1.

The values greater than 0 in the sinusoidal signals are set to 100, the values less than 0 are set to −100, and the positions equal to 0 are set to 100 and −100 according to position index parity. In this way, a 0-phase square wave signal of 1 Hz may be generated. As shown in FIG. 2, frequencies with all frequency amplitudes being 100 and phases being 0 may be generated in this way.

R(t) is set to a periodic square wave signal, and when S(t) of the sinusoidal signal in a position of t is a positive value, a signal value is set to A, that is, R(t)=A in the position of t corresponding to a time position. When S(t) of the sinusoidal signal in a position of t is a negative value, the signal value is set to −A, that is, R(t)=−A in the position of t corresponding to the time position. In this embodiment, all of the phases of the sinusoidal signals are set to 0, A=100, the values greater than 0 in the sinusoidal signals are set to 100, the values less than 0 are set to −100, and the positions equal to 0 are respectively set to 100 and −100 according to position index parity.

Figure 3:
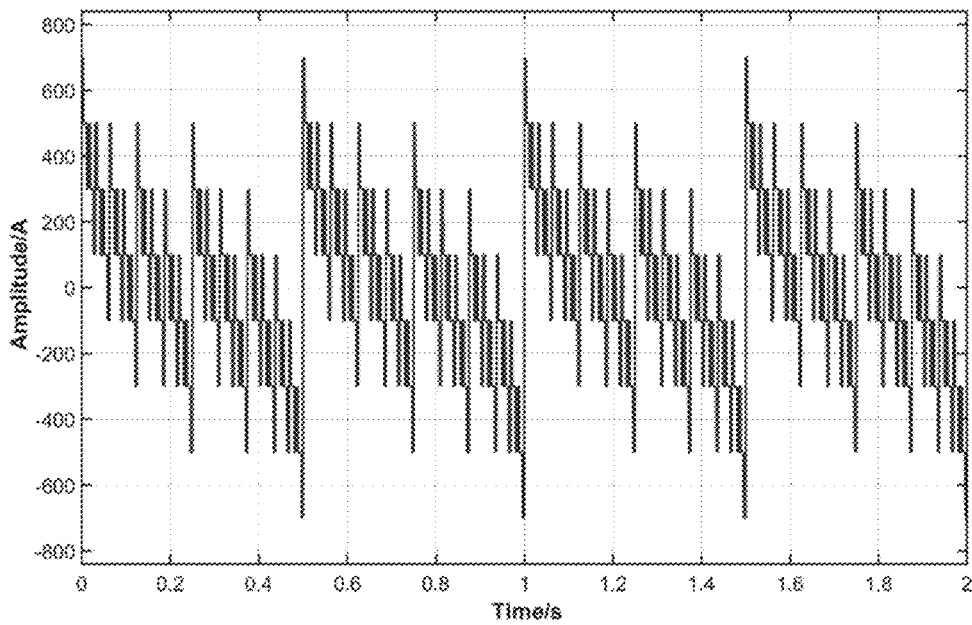
FIG. 3 includes a schematic diagram of a step signal (a) after 7 frequencies are superposed and spectra (b) of the step signal according to an embodiment of the present invention.
Figure 4:
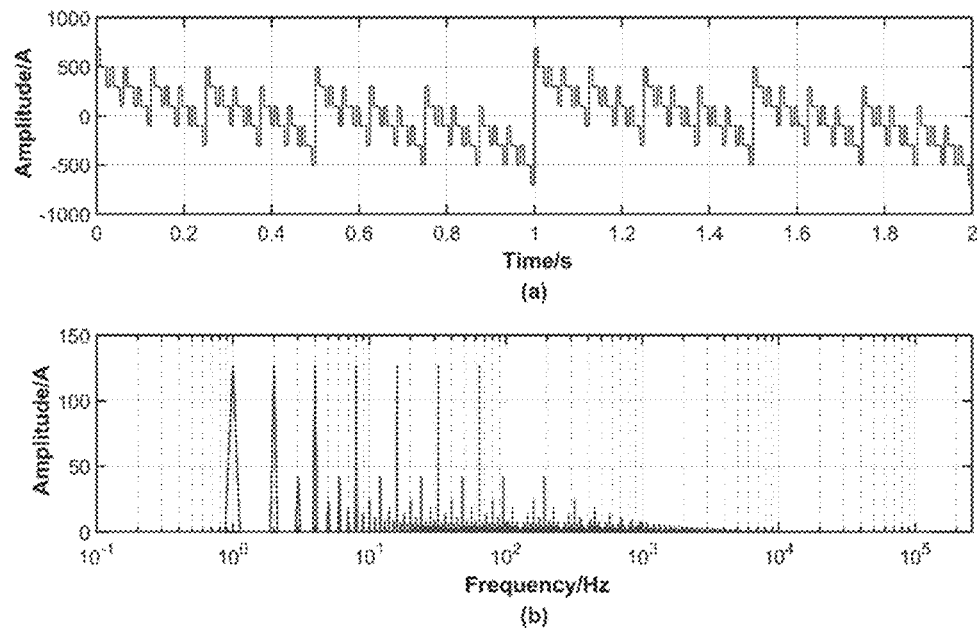
FIG. 4 includes a schematic diagram of a step signal (a) after 7 frequencies are superposed and spectra (b) of the step signal according to an embodiment of the present invention.

In this embodiment, for ease of description, the lowest frequency of the periodic square wave is referred to as a fundamental frequency, and the fundamental frequency of a generated signal in FIG. 3 is 1 Hz. It is to be noted that, superposed signals herein need to be at 2n sequence frequencies, that is, the frequency between adjacent square waves needs to be continuously increased by multiples of 2. Periodic square wave signals having other frequencies such as 2 Hz, 4 Hz, 8 Hz, . . . , and 64 Hz with 1 Hz as the fundamental frequency and phases being 0 can be generated according to the method. However, after the periodic square waves of 1 Hz, 2 Hz, 4 Hz, 8 Hz, 16 Hz, 32 Hz, and 64 Hz with the phase of 0 are superposed, a step signal including a plurality of frequencies can be obtained, and waveforms and corresponding spectra after superposition are shown in FIG. 4. In the signal obtained by means of superposition in a frequency domain, spectrum values corresponding to 1 Hz, 2 Hz, 4 Hz, 8 Hz, 16 Hz, 32 Hz, and 64 Hz are the same, that is, 100. This is because each square wave only has odd harmonics and does not have even harmonics. Therefore, odd harmonic components of 1 Hz do not influence 2 Hz and harmonic spectrum components thereof, and similarly, 2 Hz and odd harmonic components thereof do not influence 4 Hz and odd harmonic components thereof, and so on. As a result, all dominant frequencies and amplitudes of corresponding harmonics of the dominant frequencies are the same and have excellent features. The step signal serves as a first basic unit signal. The basic unit includes 7 frequencies, a lowest frequency is 1 Hz, and the phase $\varphi=0$ $\varphi=0$, so that the basic unit is referred to as a 1 Hz-7 frequency-0 phase 2n sequence basic unit.

Figure 5:
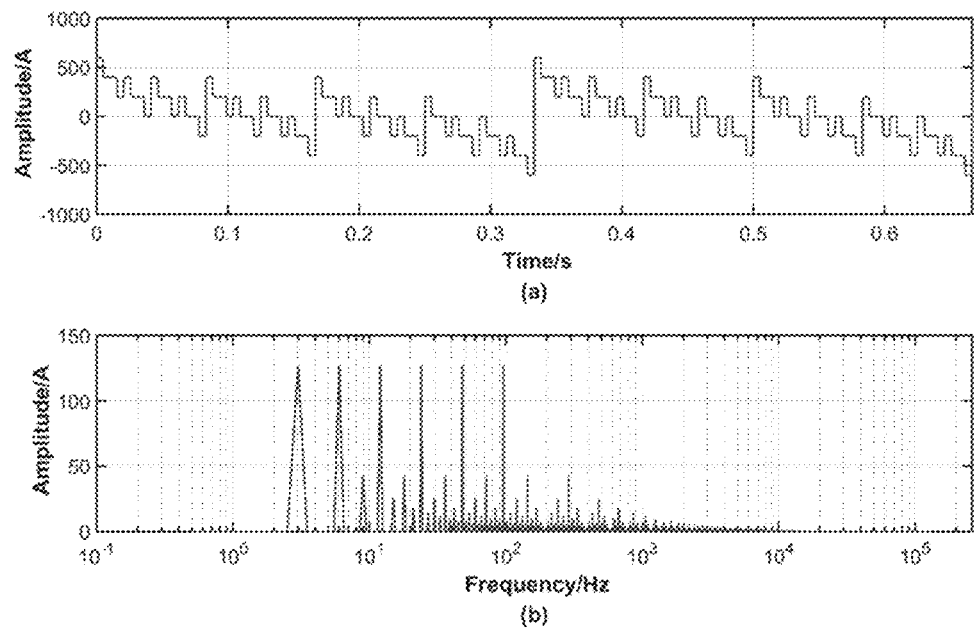
FIG. 5 includes a schematic diagram of a step signal (a) after 6 frequencies are superposed and spectra (b) of the step signal according to an embodiment of the present invention.

The lowest frequency is set to 3 Hz, a quantity of frequencies in the basic unit is 6, and a signal constructed by the basic units and spectra of the signal are shown in FIG. 5. Six periodic square waves have frequencies of 3 Hz, 6 Hz, 12 Hz, 24 Hz, 48 Hz, and 96 Hz and the same phase of 0. The superposed stairstep signal is used as a second basic unit signal, which is referred to as a 3 Hz-6 frequency-0 phase 2n sequence basic unit.

The lowest frequency of the basic unit may be changed, and the number of frequencies may be not necessarily an odd number, and may be an even number. In this embodiment, the lowest frequency of the first basic unit is a fundamental frequency, the lowest frequency of the second basic unit is 3 times the fundamental frequency, a lowest frequency of a third basic unit is 5 times the fundamental frequency, a lowest frequency of a fourth basic unit is 7 times the fundamental frequency, and the lowest frequency of an $n^{th}$ basic unit is (2n+1) times the fundamental frequency.

In this embodiment, a sum of quantities of dominant frequencies in different basic units is required to be an odd number rather than an even number. It is proved by mathematics that an amplitude of an odd quantity of periodic square waves (the signal has values of only 100 and −100) that are superposed cannot be 0, but an integer multiple of 100 or −100. Therefore, after superposition, only positions greater than 100 need to be set to 100 and positions less than −100 need to be set to −100. Assuming that a number of dominant frequencies in a first basic unit is $a_1$, a number of dominant frequencies in a second basic unit is $a_2$, and a number of dominant frequencies in a third basic unit is $a_3$, $Num_f$ is a sum $a_1$ of the numbers of dominant frequencies in all of the basic units. It is not hard to find that, when n-order 2n sequence pseudo-random signals are constructed, $Num_f=a_1+a_2+a_3+\ldots+a_n$, where $a_n$ is a number of dominant frequencies in an $n^{th}$ basic unit. In the present invention, when high-order 2n sequence pseudo-random signals are constructed, $Num_f$ needs to be an odd number, and it has no requirements for whether the number in each basic unit is the odd number. In addition, under normal circumstances, $a_1$ should be greater than a number of dominant frequencies in other basic units, so as to restrain the highest frequency in the high-order 2n sequence pseudo-random signals.

The above construction requirements simplify the processing difficulty of the follow-up superposed signals, so as to efficiently obtain the high-order 2n sequence pseudo-random signals as required by exploration.

Figure 11:
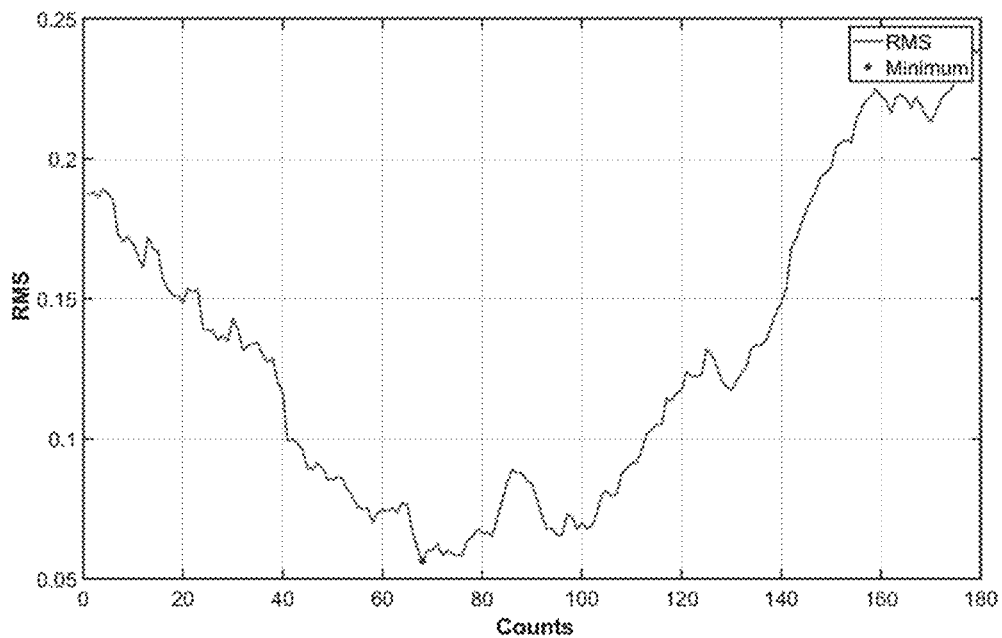
FIG. 11 is a curve of relative mean square errors of spectra of a dominant frequency under conditions of different phases in a second construction unit according to an embodiment of the present invention.
Figure 12:
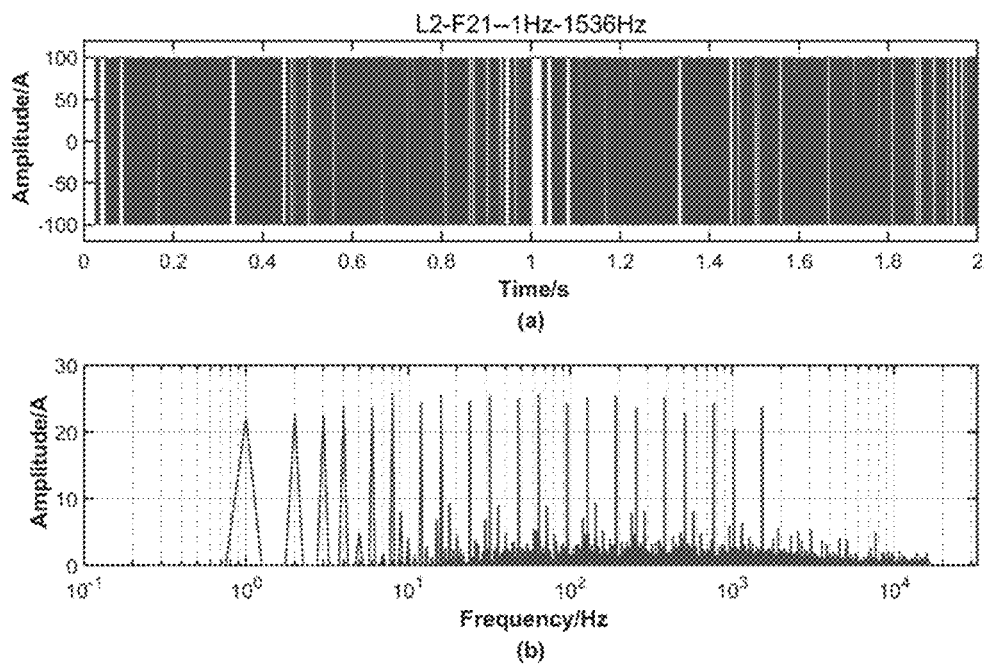
FIG. 12 is a schematic diagram of time domain waveforms (a) and spectrum features (b) of pseudo-random signals L2-F21-1 Hz-1536 Hz generated by a 1 Hz-11 frequency-0 phase construction unit and a 3 Hz-10 frequency-$67\pi/180$ phase construction unit according to an embodiment of the present invention.

In this embodiment, the number of frequencies in the basic units may be changed, a basic unit 1 Hz-11 frequency-0 phase and a basic unit 3 Hz-10 frequency-$67\pi/180$ phase may be superposed to construct 2-order 2n sequence pseudo-random signals, as shown in FIG. 11 and FIG. 12. An encoding method for a complex 2n sequence pseudo-random signal is L2-F21-1 Hz-1536 Hz. L is short for Level and means an order, F is short for Frequency and means a number of dominant frequencies that a signal includes, 1 Hz represents a lowest dominant frequency of the signal, and 1536 Hz represents a highest dominant frequency of the signal. Different orders represent different dominant frequency densities. A 2-order represents a larger dominant frequency density than that of a 1-order, and a 3-order represents a larger dominant frequency density than that of the 2-order, and so on.

In this embodiment, the number of dominant frequencies is added within a limited interval of frequency bands according to the exploration requirement, and 2n sequence stairstep signals of different orders are constructed within a limited frequency interval, thus increasing the density between the dominant frequencies, and facilitating enhancement of resolution during electromagnetic exploration.

Step 2: Superpose the two or more basic unit signals to obtain superposed stairstep signals, and correct amplitudes to be consistent with amplitudes of the square wave signals, to obtain high-order 2n sequence pseudo-random signals.

Figure 6:
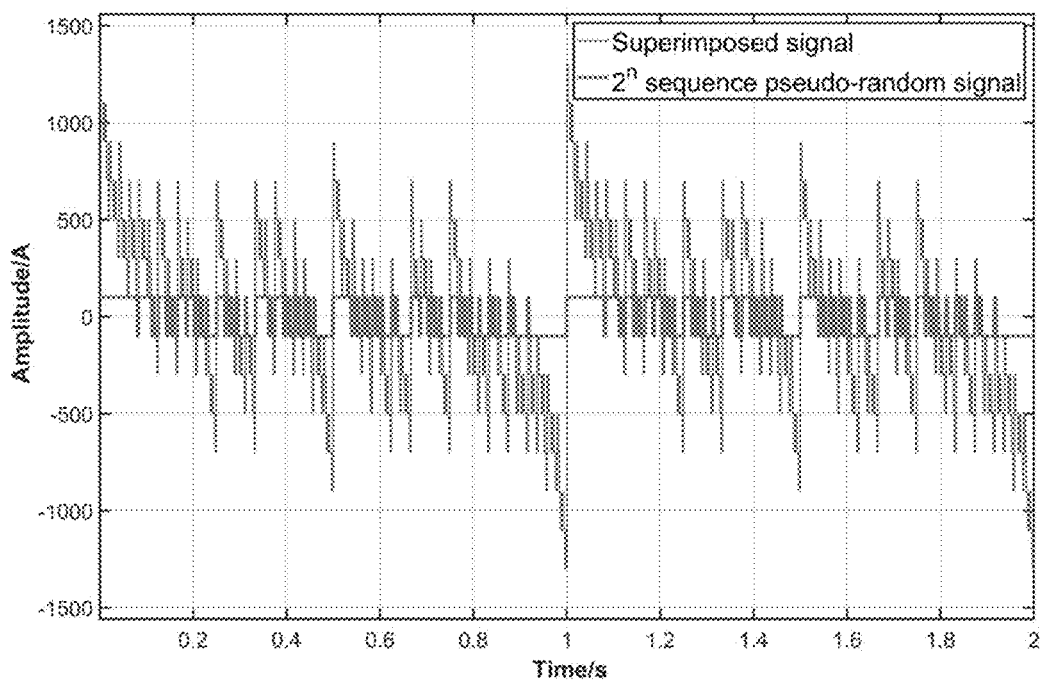
FIG. 6 shows superposed signals including 13 frequency waves and correspondingly generated pseudo-random signals according to an embodiment of the present invention.
Figure 7:
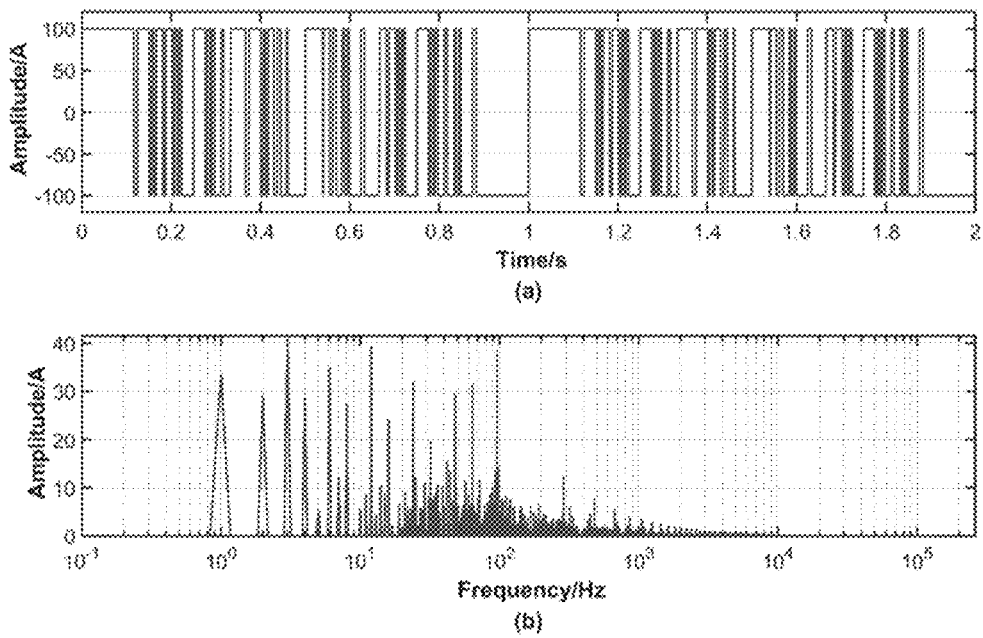
FIG. 7 is a schematic diagram of time domain waveforms (a) of pseudo-random signals including 13 frequency waves and spectra (b) according to an embodiment of the present invention.

Specifically, a set of new superposed stairstep signals are obtained after the above two sets of basic units are superposed, position amplitudes greater than A in the superposed stairstep signals are set to A, and position amplitudes less than −A are set to −A, so as to obtain 2n sequence pseudo-random signals. As shown in FIG. 6, red represents superposed stairstep signals, and blue represents pseudo-random signals. Waveforms and spectra of the pseudo-random signals are shown in FIG. 7. There are only values of 100 and −100 in signals of a time domain, but there are 13 dominant frequencies in a frequency domain, that is, an added number of 7 dominant frequencies and 6 dominant frequencies in the two basic units. In addition, because each square wave in the basic units only has 100 and −100, it can be mathematically proved that 13 100s or −100s are certainly not equal to 0 after being superposed but are bound to be values greater than or equal to 100 or less than or equal to −100. Therefore, after the superposed values greater than 100 are set to 100 and the superposed values less than −100 are set to −100, only 100 and −100 can exist in the signals, and positions equal to 0 do not exist.

However, for the pseudo-random signals obtained by directly adding the two basic units, an energy difference between dominant frequency spectra is large, and therefore the pseudo-random signals are not applicable to electromagnetic exploration in the frequency domain. As a result, the superposition method needs to be optimized.

Step 3: Perform a phase adjustment on at least one of the two or more basic unit signals, and find a phase that minimizes a mean square error of amplitudes of spectra corresponding to dominant frequencies in a superposed high-order 2n sequence pseudo-random signal as an optimal phase of the corresponding basic unit signal; and superpose the two or more basic unit signals according to the optimal phase, and correct the amplitudes to be consistent with the amplitudes of the square wave signals, to obtain high-order 2n sequence pseudo-random signals.

In this embodiment, uniformity between amplitudes is determined by calculating magnitudes of mean square errors of spectrum amplitudes corresponding to dominant frequencies, a phase that minimizes data of the mean square errors is selected as an optimal phase, to cause amplitudes of the spectra corresponding to main frequencies (dominant frequencies) to be uniform, that is, to cause an energy distribution of the dominant frequencies to be more uniform. Specifically, by continuously changing phases of a basic signal construction unit, that is, $\varphi$ in the formula of generating a sinusoidal signal, stairstep signals superposed by periodic square waves of corresponding phases are further generated. High-order 2n sequence pseudo-random signals are generated by utilizing such a combination mode, to cause the amplitudes of the spectra corresponding to the main frequencies (dominant frequencies) to be uniform, that is, to cause the energy distribution of the dominant frequencies to be more uniform.

Specifically, for basic unit signals on which a phase adjustment is performed, a phase radian w in a half period is firstly divided into N parts (after a part is greater than the phase radian w in the half period, signals are reversed, but overall forms of the signals are consistent, and therefore only the phases of the half period need to be considered), that is, a phase-changed basic unit is $\pi$. One phase-changed basic unit is adjusted each time, and the mean square error of the amplitudes of the spectra values corresponding to the dominant frequencies in the superposed high-order 2n sequence pseudo-random signal is recorded. A variation curve of the mean square errors with the phase is drawn, and a phase that minimizes the mean square errors is found as an optimal phase of the basic unit signal.

Figure 8:
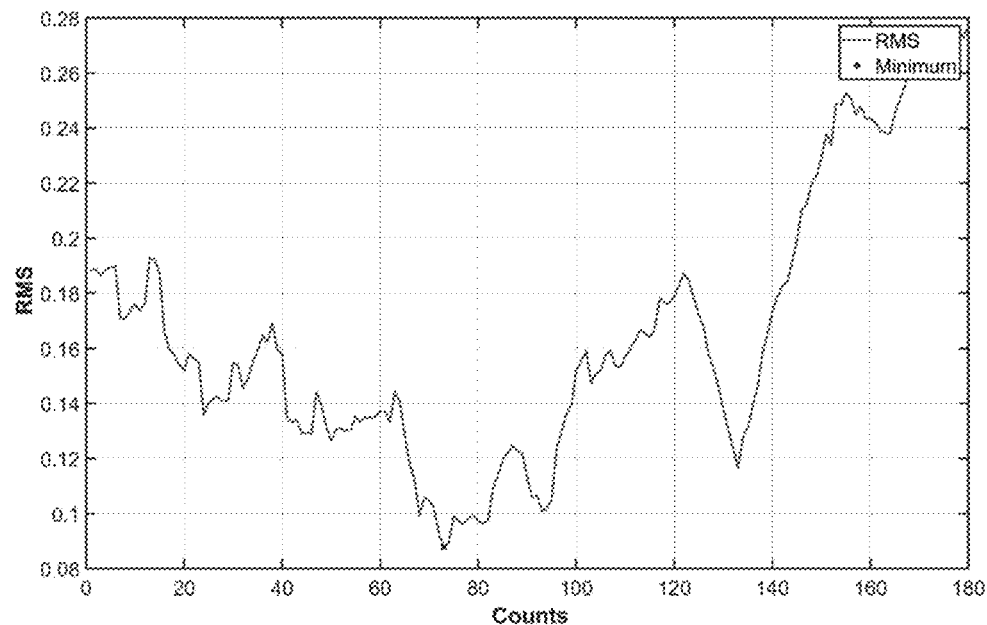
FIG. 8 is a curve of relative mean square errors of dominant frequency spectra under the condition that a second construction unit selects different phases according to an embodiment of the present invention.
Figure 9:
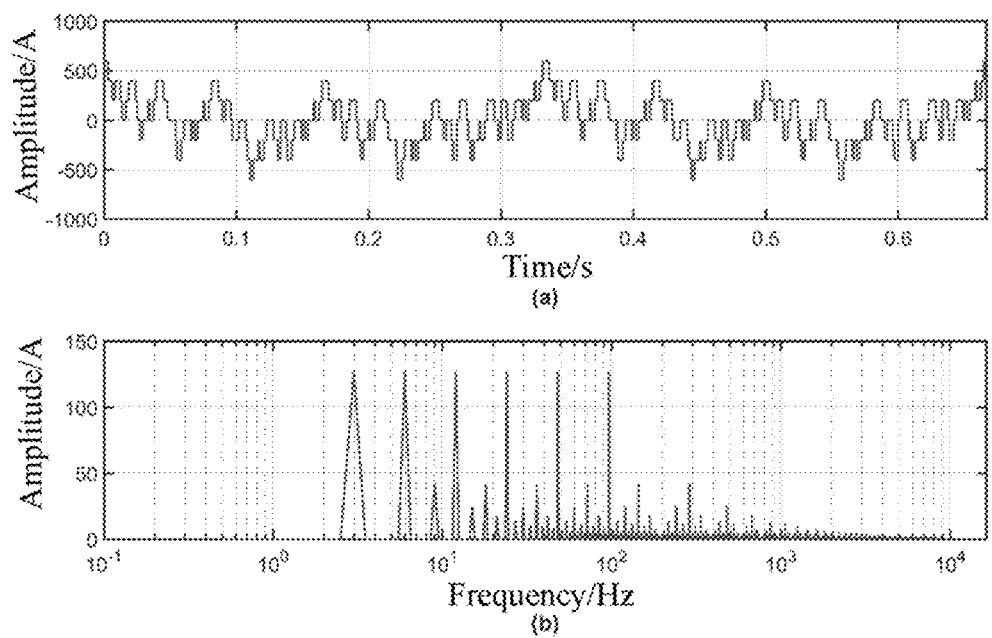
FIG. 9 is a schematic diagram of time domain waveforms (a) and spectrum features (b) corresponding to a 3 Hz-6 frequency-$2\pi/5$ phase construction unit according to an embodiment of the present invention.
Figure 10:
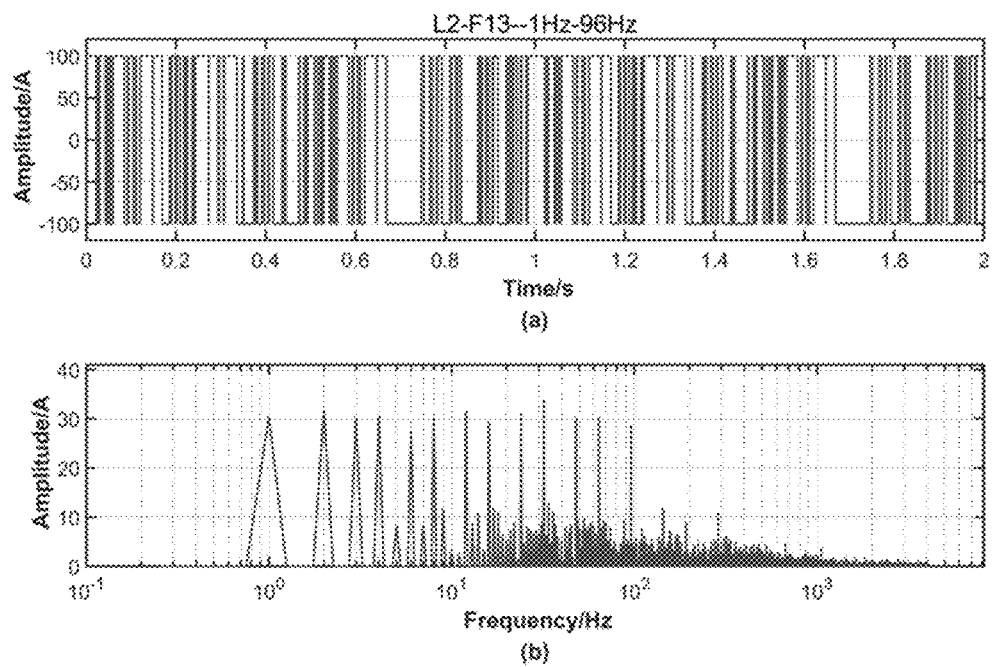
FIG. 10 is a schematic diagram of time domain waveforms (a) and spectrum features (b) of pseudo-random signals corresponding to a 1 Hz-7 frequency-0 phase and a 3 Hz-6 frequency-$2\pi/5$ phase according to an embodiment of the present invention.

In this embodiment, it is assumed that a phase radian $\pi$ in a half period of pseudo-random signals during generation is divided into $\pi/180$, the phase is changed by $\pi/180$ each time, which is successively increased, that is, a value of $\varphi$ in the formula is changed each time, and possible values thereof are successively 0, $\pi/180$, $2\pi/180$, $3\pi/180$, ..., and $179\pi/180$. When a high-order 2n sequence pseudo-random signal is constructed for the first time, a 1 Hz-7 frequency-0 phase basic unit is not changed, and a 3 Hz-6 frequency-0 phase is used as a second basic unit. After two basic units are superposed, positions greater than 100 are set to 100, and positions less than −100 are set to −100, relative mean square error values of spectrum values corresponding to 13 dominant frequencies are calculated and recorded at this point. A phase of a second construction unit is changed to $\pi/180$, and the second construction unit is changed to 3 Hz-6 frequency-$\pi/180$, and the relative mean square error values of spectrum values corresponding to 13 dominant frequencies are calculated and recorded at this point, and so on, to obtain $2\pi/180$, $3\pi/180$, ..., and $179\pi/180$. The phase of the second basic unit corresponding to the minimum relative mean square error is obtained through comparison of curves of relative mean square errors of corresponding pseudo-random signals in 180 different phases. As shown in FIG. 8, the minimum point of the relative mean square error is a value 73 in an abscissa, that is, the corresponding phase of the second basic unit is $2\pi/5$, which is used as the optimal construction method of pseudo-random signals having 13 frequencies, that is, when the phase of the first basic unit is 0, that is, the first basic unit is a 1 Hz-7 frequency-0 phase basic unit, and when the phase of the second basic unit is $2\pi/5$, the second basic unit is a 3 Hz-6 frequency-$2\pi/5$ phase basic unit, as shown in FIG. 9, and the optimal construction method for an L2-F13-1 Hz-96 Hz pseudo-random signal is obtained, as shown in FIG. 10.

Figure 19:
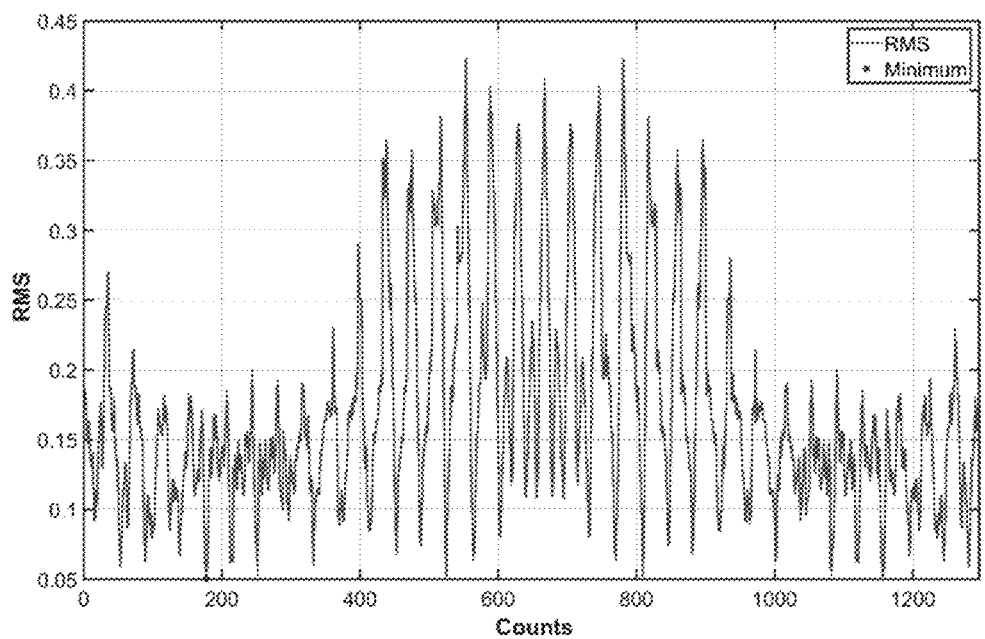
FIG. 19 is a variation curve of relative mean square errors of spectra of a dominant frequency of a 2-order signal with phases according to an embodiment of the present invention.
Figure 20:
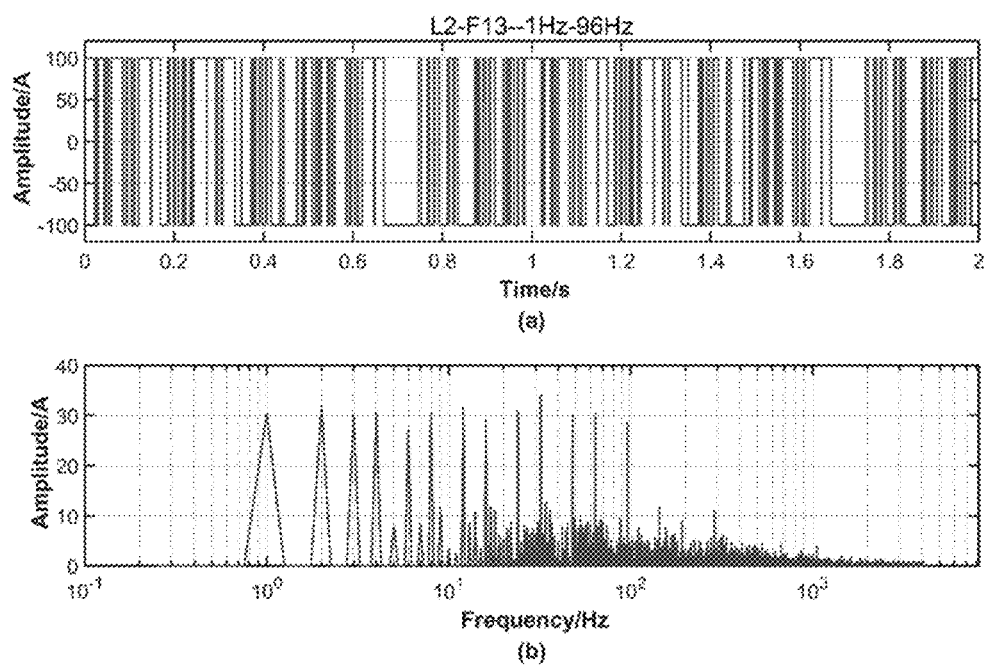
FIG. 20 is a schematic diagram of time domain waveforms (a) and spectra (b) of pseudo-random signals corresponding to 1 Hz-7 frequency-$\pi/9$ phase and a 3 Hz-6 frequency-$\pi/9$ phase according to an embodiment of the present invention.
Figure 21:
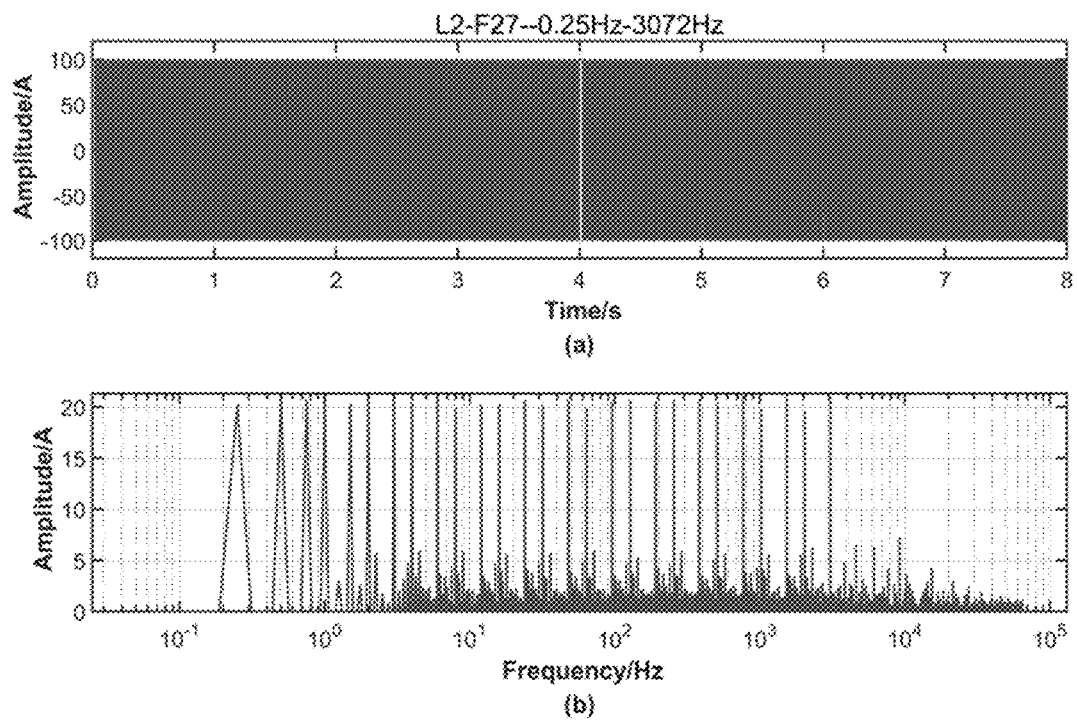
FIG. 21 is a schematic diagram of time domain waveforms (a) and spectra (b) of a 2-order signal (L2-F27-0.25 Hz-3072 Hz) applicable to shallow exploration according to an embodiment of the present invention.
Figure 22:
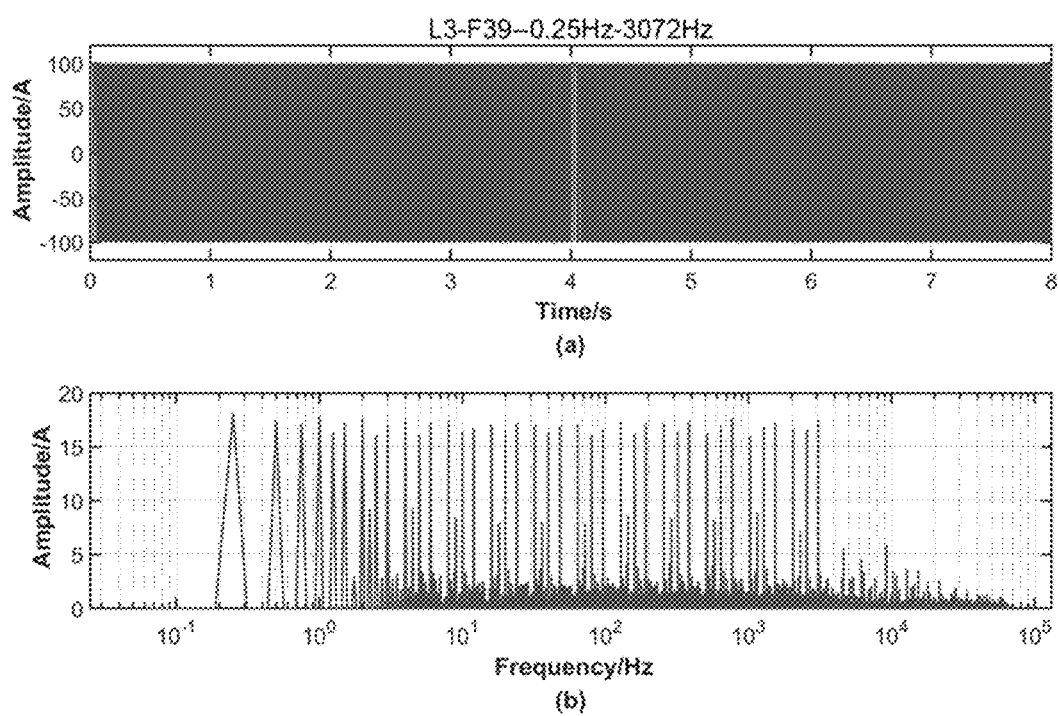
FIG. 22 is a schematic diagram of time domain waveforms (a) and spectra (b) of a 3-order signal (L3-F39-0.25 Hz-3072 Hz) applicable to shallow exploration according to an embodiment of the present invention.

The corresponding phase p of the first basic unit is allowed to be changed. When a 1 Hz-7 frequency basic unit and a 3 Hz-6 frequency basic unit are superposed to generate a 2n sequence signal, the phases of two basic units are changed simultaneously. When N=36, a variation curve of corresponding relative mean square errors is shown in FIG. 19. Corresponding phases of the two basic units at the minimum value points are respectively $\pi/9$ and $2\pi/9$, and at this point, time domain waveforms and spectra of corresponding 2-order 2n sequence pseudo-random signals are shown in FIG. 20.

Figure 13:
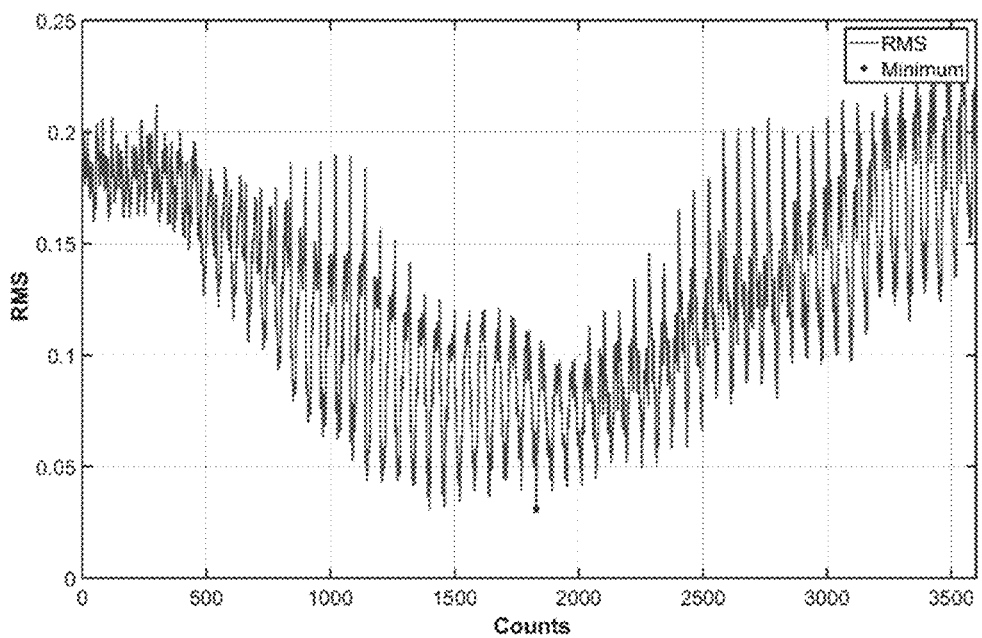
FIG. 13 is a variation curve of a relative mean square error of amplitudes of spectra of dominant frequencies in varying phases of a 3-order signal construction unit according to an embodiment of the present invention.

If a 3-order 2n sequence pseudo-random signal is constructed through three basic units, when the high-order 2n sequence pseudo-random signal is constructed, the phase radian win a half period is divided into 60 basic units (that is, N=60). A phase of a first construction unit is set to a constant of 0, and there are a total of 3600 combinations of phase changes of other two construction basic units. A combination mode of pseudo-random signals in each of the combinations is calculated and recorded, and a position of the minimum relative mean square error of amplitudes of spectra of dominant frequencies is obtained through comparison, and phase information at this position corresponding to different basic units is acquired, as shown in FIG. 13 and FIG. 14.

The minimum value point of the relative mean square error of the amplitudes of the spectra of the dominant frequencies is acquired by continuously changing the phase of the basic construction unit, that is, the 2n sequence pseudo-random signal is optimally distributed to the spectrum component.

Figure 14:
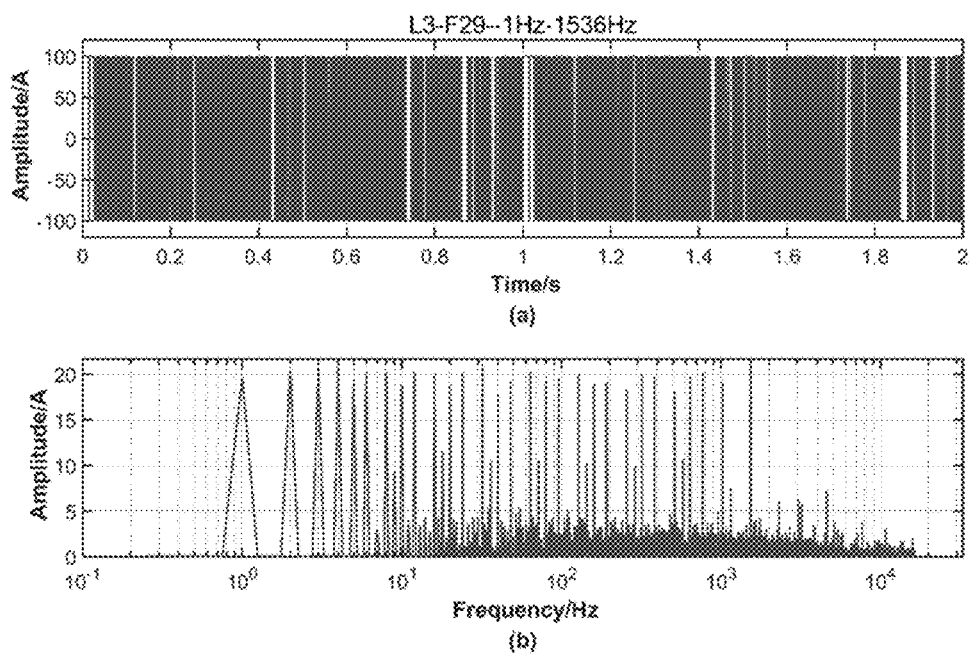
FIG. 14 is a schematic diagram of waveforms (a) and spectra (b) of a 3-order 2n sequence signal (L3-F29-1 Hz-1536 Hz) according to an embodiment of the present invention.

As shown in FIG. 14, a serial number of the pseudo-random signal is L3-F29-1 Hz-1536 Hz, which indicates a 3-order 29-frequency 2n sequence pseudo-random signal having a lowest dominant frequency being 1 Hz and a highest dominant frequency being 1536 Hz. The three basic units are respectively 1 Hz-11 frequency-0 phase, 3 Hz-10 frequency-$\pi/2$ phase, and 5 Hz-8 frequency-$9\pi/20$ phase, and the three basic units obtain a 2-order 2n sequence pseudo-random signal with optimal distribution of energy of the dominant frequency at this frequency band under corresponding phase conditions, as shown in spectra (b) of FIG. 14.

Figure 15:
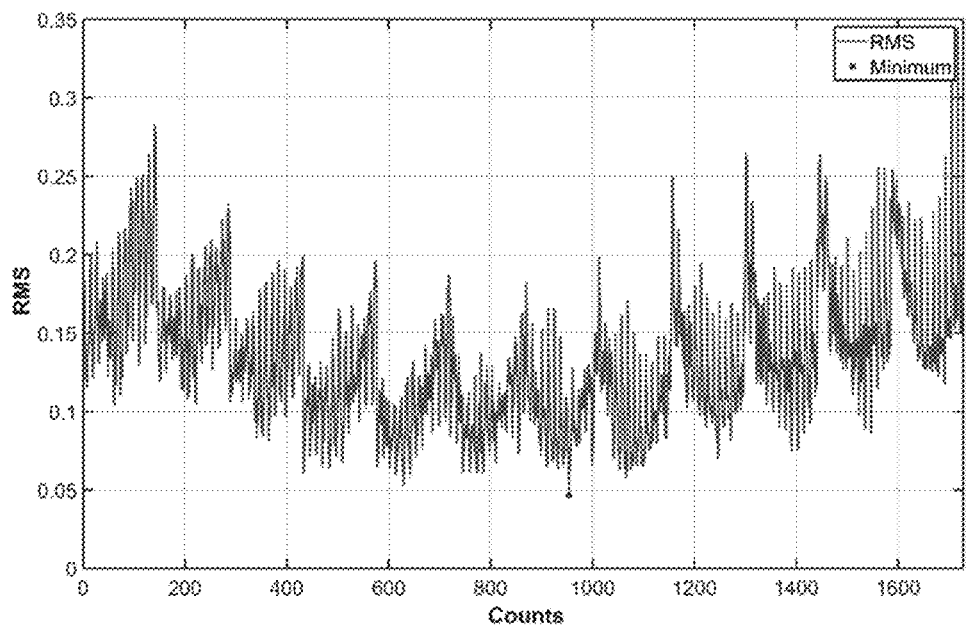
FIG. 15 is a variation curve of phases of a 4-order signal according to an embodiment of the present invention.
Figure 16:
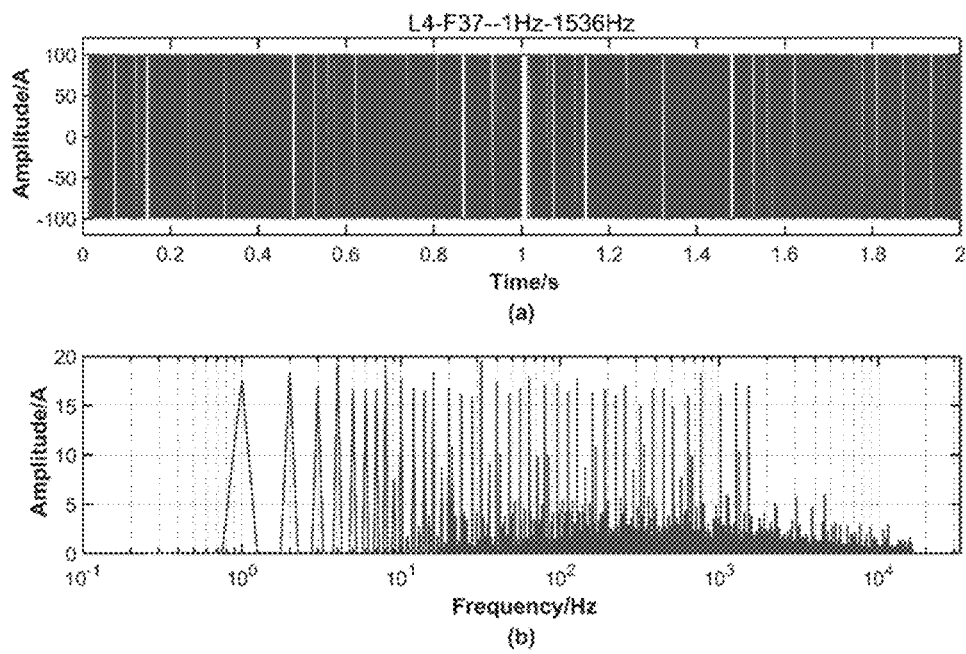
FIG. 16 is a schematic diagram of waveforms (a) and spectra (b) of a 4-order 2n sequence signal (L3-F29-1 Hz-1536 Hz) according to an embodiment of the present invention.
Figure 17:
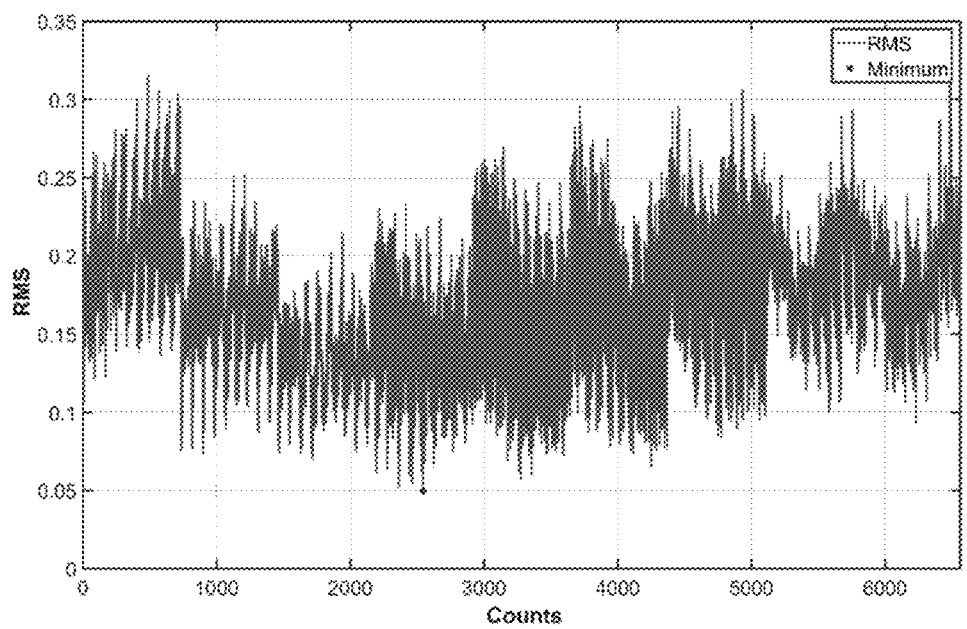
FIG. 17 is a variation curve of relative mean square errors of spectra of a dominant frequency of a 5-order signal with phases according to an embodiment of the present invention.
Figure 18:
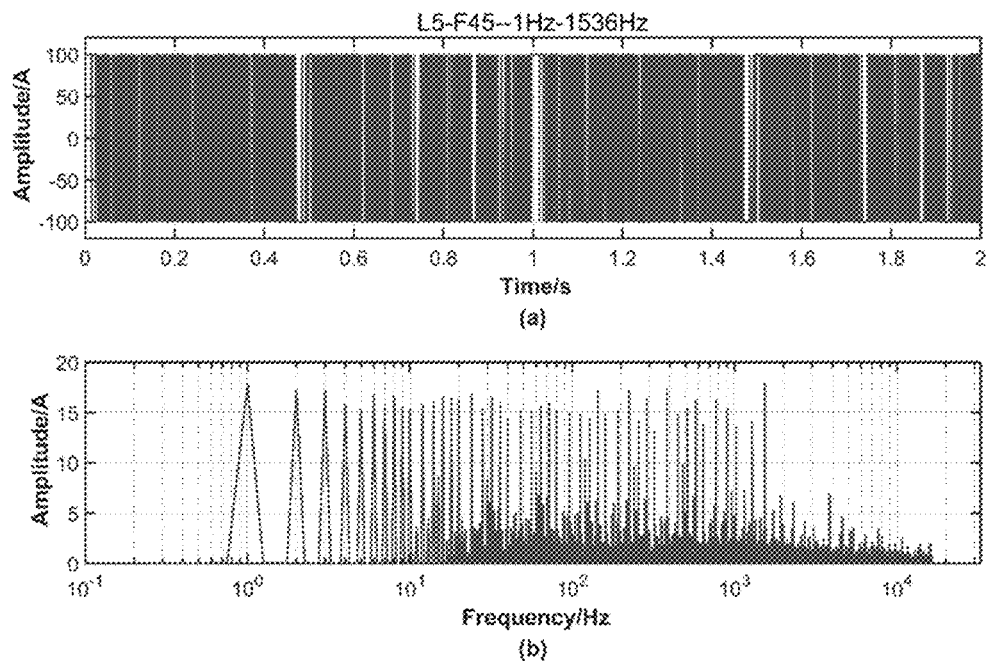
FIG. 18 is a schematic diagram of waveforms (a) and spectra (b) of a 5-order 2n sequence signal (L5-F45-1 Hz-1536 Hz) according to an embodiment of the present invention.

According to the construction method provided in the present invention, higher-order signals may be constructed within a fixed frequency interval, for example, a 4-order 2n sequence pseudo-random signal L4-F37-1 Hz-1536 Hz shown in FIG. 15 and FIG. 16, and a 5-order 2n sequence pseudo-random signal L5-F45-1 Hz-1536 Hz shown in FIG. 14 and FIG. 15.

In the present invention, the generated frequency interval of the high-order 2n sequence pseudo-random signals can be changed according to the exploration requirement. In general, the lowest frequency of the frequency interval is not less than 0.015625 Hz, and the highest frequency of the frequency interval is not higher than 8192 Hz.

By means of the method of this embodiment, a signal of L2-F27-0.25 Hz-3072 Hz applicable to high-precision shallow exploration can be constructed. A phase of a construction unit having a dominant frequency of 0.25 Hz is 10 degrees, and a phase of a construction unit having a dominant frequency of 0.75 Hz is 120 degrees. For a signal of L3-F39-0.25 Hz-3072 Hz, a phase of a construction unit having a dominant frequency of 0.25 Hz is 0 degrees, a phase of a construction unit having dominant frequency of 0.75 Hz is 90 degrees, and a phase of a construction unit having a dominant frequency of 1.25 Hz is 90 degrees.

Embodiment 2

An objective of this embodiment is to provide a computer readable storage medium, storing a plurality of instructions, the instructions being adapted to be loaded and executed by a processor of a terminal device.

constructing two or more basic unit signals according to an exploration requirement, wherein the basic unit signals are stairstep signals obtained by superposing a plurality of in-phase periodic square wave signals, and a frequency ratio between adjacent ones of the plurality of square wave signals is 2; and superposing the two or more basic unit signals to obtain superposed stairstep signals, and correcting amplitudes to be consistent with amplitudes of the square wave signals, to obtain high-order 2n sequence pseudo-random signals.

Embodiment 3

An objective of the embodiment is to provide a terminal device, including a processor and a computer-readable storage medium, the processor being configured to implement instructions, the computer-readable storage medium being configured to store a plurality of instructions, the instructions being adapted to be loaded and performed by the processor.

constructing two or more basic unit signals according to an exploration requirement, where the basic unit signals are stairstep signals obtained by superposing a plurality of in-phase periodic square wave signals, and a frequency ratio between adjacent ones of the plurality of square wave signals is 2; and superposing the two or more basic unit signals to obtain superposed stairstep signals, and correcting amplitudes to be consistent with amplitudes of the square wave signals, to obtain high-order 2n sequence pseudo-random signals.

Embodiment 4

An objective of this embodiment is to provide an electrical exploration signal transmitter, adopting a method for generating a signal according to an embodiment to obtain a high-order 2n sequence pseudo-random signal that meets the exploration requirement.

The above descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

The above descriptions are merely preferred embodiments of the present invention and are not intended to limit the present invention. Those skilled in the art may make various modifications and changes to the present invention. Any modification, equivalent replacement, or improvement made within the spirit and principle of the present invention shall fall within the protection scope of the present invention.

What is claimed is:

1. A method for generating a high-order pseudo-random electromagnetic exploration signal, the method comprising:
constructing two or more basic unit signals according to an exploration requirement, wherein the basic unit signals are stairstep signals obtained by superposing a plurality of in-phase periodic square wave signals, and a frequency ratio between adjacent ones of the plurality of periodic square wave signals is 2; and
superposing the two or more basic unit signals to obtain superposed stairstep signals, and correcting amplitudes to be consistent with amplitudes of the periodic square wave signals, to obtain high-order $2^n$ sequence pseudo-random signals,
the method further comprising:
performing a phase adjustment on at least one of the two or more basic unit signals, and finding a phase that minimizes a relative mean square (RMS) error of amplitudes of spectra corresponding to dominant frequencies in a superposed high-order $2^n$ sequence pseudo-random signal as an optimal phase of the corresponding basic unit signal; and
superposing the two or more basic unit signals according to the optimal phase, and correcting the amplitudes to be consistent with the amplitudes of the periodic square wave signals, to obtain final high-order $2^n$ sequence pseudo-random signals, wherein
a method for finding the optimal phase comprises:
for the basic unit signal on which the phase adjustment is performed, dividing a phase radian $\pi$ in a half period into N parts, to obtain phase-changed basic units $\pi/N$;
adjusting one phase-changed basic unit in every one time, and recording the RMS error of the amplitudes of the spectra corresponding to the dominant frequencies in the superposed high-order $2^n$ sequence pseudo-random signal; and drawing a variation curve of the RMS error with a phase, and finding a phase that minimizes the RMS error as the optimal phase of the basic unit signal.

2. The method for generating a high-order pseudo-random electromagnetic exploration signal according to claim 1, wherein the two or more basic unit signals meet the following requirements:

if a lowest dominant frequency in a first basic unit signal is recorded as a fundamental frequency, a lowest dominant frequency of an $n^{th}$ basic unit signal is $(2n+1)$ times the fundamental frequency, wherein n is a natural number greater than 1; and a sum of numbers of dominant frequencies of all of the basic unit signals is an odd number.

3. The method for generating a high-order pseudo-random electromagnetic exploration signal according to claim 1, wherein a method for generating the periodic square wave comprises:

generating sinusoidal signals having the same frequency as a target periodic square wave, and setting values of the sinusoidal signals that are greater than 0 to A and values of the sinusoidal signals that are less than 0 to $-A$, to obtain a series of in-phase periodic square wave signals, wherein $A \neq 0$; and assigning A or $-A$ to positions of periodic square wave signals having a value of 0 to obtain periodic square wave signals having no value of 0.

4. The method for generating a high-order pseudo-random electromagnetic exploration signal according to claim 1, wherein a signal applicable to shallow exploration that is constructed according to the method comprises:

a second-order $2^n$ sequence pseudo-random signal, wherein dominant frequencies and phases of two basic unit signals are respectively 0.25 Hz and 10 degrees and 0.75 Hz and 120 degrees; and a third-order $2^n$ sequence pseudo-random signal, wherein dominant frequencies and phases of three basic unit signals are respectively 0.25 Hz and 0 degrees, 0.75 Hz and 90 degrees, and 1.25 Hz and 90 degrees.

5. A terminal device, comprising a processor and a computer readable storage medium, the processor being configured to execute instructions, and the computer readable storage medium being configured to store a plurality of instructions, wherein the instructions are adapted to be loaded by the processor to perform the method for generating a high-order pseudo-random electromagnetic exploration signal according to claim 1.

6. A non-transitory computer readable storage medium, storing a plurality of instructions therein, wherein the instructions are adapted to be loaded by a processor of a terminal device to perform the method for generating a high-order pseudo-random electromagnetic exploration signal according to claim 1.

7. An electrical exploration signal transmitter, configured to generate a high-order $2^n$ sequence pseudo-random signal by using the method for generating a high-order pseudo-random electromagnetic exploration signal according to claim 1.

\* \* \* \* \*